United States Patent [19]
Charlton et al.

[11] 4,218,425
[45] Aug. 19, 1980

[54] PROCESS FOR EXTRACTING ARSENIC FROM OXIDIC MATERIALS

[75] Inventors: Thomas L. Charlton, Rossland; Robert F. Redden, Fruitvale, both of Canada

[73] Assignee: Cominco Ltd., Vancouver, Canada

[21] Appl. No.: 920,604

[22] Filed: Jun. 29, 1978

[51] Int. Cl.$^2$ ............................................. C01B 27/02
[52] U.S. Cl. ..................................................... 423/87
[58] Field of Search ............... 423/87, 617; 75/101 R, 75/121

[56] References Cited

U.S. PATENT DOCUMENTS 4,102,976  7/1978  Hiemeleers et al. .................... 423/87

FOREIGN PATENT DOCUMENTS 1169427  3/1964  Fed. Rep. of Germany ............. 423/87

OTHER PUBLICATIONS

Schumb et al., Hydrogen Peroxide, (1955), Reinhold Publishing Corporation, pp. 4–7, 400–402.

*Primary Examiner*—Wayne A. Langel
*Attorney, Agent, or Firm*—Arne I. Fors; Robert F. Delbridge

[57] ABSTRACT

A process is disclosed for the selective extraction of arsenic from oxidic materials containing compounds such as arsenic trioxide, arsenic pentoxide, antimony trioxide, antimony pentoxide, antimony tetroxide and mixtures thereof in which arsenic is effectively separated from antimony. Said oxidic materials are subjected to a leach with a lixiviant containing arsenic acid or hydrogen peroxide at a temperature in the range of 40° C. to the boiling point of the reaction mixture, preferably in the range of 80° to 100° C., for 5 to 90 minutes. The leach solution containing arsenic oxides is separated from leach residue. The leach solution is either cooled to a temperature in the range of 5° to 25° C. to crystallize and subsequently recover arsenic trioxide or the solution is oxidized and evaporated and arsenic pentoxide is recovered. Arsenic acid lixiviant contains 5 to 500 g/l arsenic as arsenic pentoxide, preferably 25 to 200 g/l, and hydrogen peroxide lixiviant preferably contains a 10 to 60% hydrogen peroxide concentration.

5 Claims, No Drawings

PROCESS FOR EXTRACTING ARSENIC FROM OXIDIC MATERIALS

BACKGROUND OF THE INVENTION

This invention relates to a process for separating arsenic from antimony and, more specifically, to a process for the treatment of arsenic and antimony-containing oxidic materials for the recovery of arsenic oxides.

Arsenic and antimony occur in arsenic and antimony minerals as such and in combination with ferrous and non-ferrous metal-containing ores and concentrates. Such ores and concentrates are normally treated for the recovery of ferrous and non-ferrous metals by a number of well known processes based on pyro and/or hydrometallurgical techniques. Arsenic and antimony are present in the form of various compounds formed during these processes and are often concentrated in process materials such as residues, slimes, dusts and fumes in the form of a mixture of oxides. Because of low value, these materials have often been impounded and stockpiled. However, various markets for both arsenic and antimony oxides have developed and an incentive now exists to recover the arsenic and antimony in the form of relatively pure trioxides or pentoxides.

Although there are a number of processes known for the recovery of arsenic and anitmony from ores and concentrates and for the production of antimony and arsenic trioxides and pentoxides, there are few or no commercial and economical processes for the separation of arsenic from high antimony-containing materials.

Processes for the oxidation of arsenic trioxide to arsenic pentoxide which may involve electrolysis or the use of oxidizing agents such as chlorine, nitric acid, nitrogen oxides and oxygen, perchlorate, air and iodine, and hydrogen peroxide have been disclosed in the art. However, none of these processes provides a satisfactory and economical method for the recovery of a relatively pure arsenic trioxide and/or pentoxide or forms the basis for an efficient method for the separation of arsenic and antimony.

It has now been discovered that oxidic materials containing arsenic and antimony can be selectively leached to provide a solution containing a portion of the arsenic present in the oxidic materials and containing substantially no antimony, and a solids residue containing substantially all antimony and the remaining portion of the arsenic. It is, therefore, an object of the present invention to provide a process for the separation of arsenic and antimony.

It is another object of the present invention to provide a process for the selective leaching of arsenic from materials containing arsenic and antimony.

It is a further object of the present invention to provide an economical process for the production of arsenic oxides from arsenic and antimony oxides-containing materials.

These and other objects of the invention and the manner in which they can be attained will become apparent from the following description of the process of the invention.

STATEMENT OF INVENTION

There is provided a process for extraction of arsenic from oxidic materials containing arsenic and antimony which comprises the steps of subjecting said materials to a leach with a lixiviant containing a compound chosen from the group consisting of arsenic acid and hydrogen peroxide, forming a reaction mixture of said materials and said lixiviant, extracting at least a portion of the arsenic from said materials in a leach solution and substantially retaining antimony in a leach residue.

More particularly, the process of our invention is for the selective extraction of arsenic from oxidic materials containing arsenic trioxide, arsenic pentoxide, antimony trioxide, antimony pentoxide, antimony tetroxide and mixtures thereof in which, in a first embodiment, said materials are sujected to a leach with a lixiviant containing arsenic acid at a temperature in the range of 40° C. to the boiling point of the reaction mixture, preferably in the range of 80° to 100° C., for 5 to 90 minutes and the leach solution containing arsenic oxides is separated from leach residue. The leach solution is cooled to a temperature in the range of 5° to 25° C. whereby arsenic trioxide is crystallized with formation of mother liquor and crystallized arsenic trioxide is recovered. Mother liquor is returned to the leach, preferably after regeneration of arsenic acid, most preferably after regeneration of arsenic acid with hydrogen peroxide.

Recovered crystallized arsenic trioxide may be treated with hydrogen peroxide solution containing hydrogen peroxide in an at least stoichiometric amount for the oxidation of arsenic trioxide to arsenic pentoxide. In such treatment, the temperature during oxidation is controlled at less than 100° C. to avoid thermal or catalytic decomposition of the hydrogen peroxide, the solution from the oxidation is heated until a boiling point of the solution in the range of 200° to 200° C. is attained, the boiled solution is cooled to solidify hydrated arsenic pentoxide and solidified hydrated arsenic pentoxide is recovered.

In a second embodiment, said materials are subjected to a leach with a lixiviant containing hydrogen peroxide at a temperature in the range of 40° C. to the boiling point of the reaction mixture, preferably in the range of 80° to 100° C., for 5 to 90 minutes, the leach solution is separated from leach residue and arsenic pentoxide is recovered.

Leach solution containing arsenic pentoxide is recovered as such, or in concentrated form, or is heated until a boiling point of the solution in the range of 200° to 220° C. is attained, the boiled solution is cooled and solidified hydrated arsenic pentoxide is recovered.

Arsenic acid lixiviant contains 5 to 500 g/l arsenic as arsenic pentoxide, preferably 25 to 200 g/l, and hydrogen peroxide lixiviant preferably contains a 10 to 60% hydrogen peroxide concentration.

DESCRIPTION OF THE PREFERRED EMBODIMENTS

Feed materials for the process may comprise oxidic materials containing arsenic and antimony contained in residues, slimes, dusts and fumes obtained from the pyro and/or hydrometallurgical treatments of ores and concentrates. These ores and concentrates may comprise antimony and/or arsenic sulfide or oxide-containing materials, or mixed sulfides or oxides which contain major amounts of ferrous and non-ferrous metal minerals, as well as precious metals. Arsenic and antimony are usually present in the feed materials to the process of the invention as trivalent and pentavalent oxides or mixed arsenic-antimony oxides, while antimony may also be present as the tetroxide.

Feed materials are subjected to a leach with a lixiviant at elevated temperature for a period of time sufficient to extract arsenic in a leach solution, leaving a leach residue. Prior to the leach, the feed materials may be slurried with water, or lixiviant, or with wash liquid obtained from washing of leach residue. Slurries of feed materials containing as high as 800 g/l solids may be successfully treated, but, for practical purposes, slurries containing from 100 to 500 g/l solids are normally used.

The lixiviants that have been found to selectively extract arsenic from the feed materials are an arsenic acid solution and a hydrogen peroxide solution. Arsenic acid lixiviant extracts arsenic into the leach solution as arsenic trioxide while extraction with hydrogen peroxide lixiviant results in the dissolution of arsenic from the feed materials as arsenic pentoxide. Without being bound by theoretical explanations, we belive that hydrogen peroxide dissolves arsenic which is rapidly oxidized to arsenic acid by the hydrogen peroxide and the arsenic acid in turn extracts further amounts of arsenic for oxidation to arsenic acid by hydrogen peroxide. The degree of selectivity of the leach depends on the solubilities of the oxides of arsenic and antimony in the leach solution.

When antimony tetroxide is present in the feed materials, an amount of pentavalent arsenic in the leach solution is lost from solution. Without being bound by theoretical considerations, we believe that pentavalent arsenic replaces trivalent arsenic in the leach residue containing antimony tetroxide with a consequent reduction in the amount of pentavalent arsenic in the leach solution. Antimony tetroxide is thought to be a mixed-valence oxide of trivalent and pentavalent antimony and is usually present in antimony-containing materials which have been subjected to high temperatures. When using hydrogen peroxide lixiviant in sufficient amount, trivalent arsenic in the leach solution will be oxidized to pentavalent arsenic.

The amount of arsenic acid and hydrogen peroxide in the respective lixiviants should be at least sufficient to extract the extractable portion of arsenic from the feed materials as arsenic trioxide and pentoxide, respectively, but should preferably not exceed the amount with which undesirable quantities of antimony are dissolved in the leach solution. The amount of hydrogen peroxide in the lixiviant also depends on the amount of antimony tetroxide present in the feed materials and the amount of hydrogen peroxide present, as defined above, should be increased to oxidize the amount of arsenic trioxide formed by the replacement with pentavalent arsenic in the leach residue containing antimony tetroxide. The concentration of arsenic acid in the arsenic acid lixiviant may be in the range of 5 to 500 g/l arsenic as arsenic pentoxide, preferably in the range of 25 to 200 g/l. Below 25 g/l the rate of arsenic extraction is too low, which affects the efficiency of the process, while concentrations above 200 g/l cause an undesirable amount of antimony to dissolve in the leach solution. The concentration of hydrogen peroxide in the hydrogen peroxide lixiviant may be in the range of 10 to 60%.

p The leach may be carried out at room temperature, but is preferably carried out at elevated temperatures at which the extraction is more effective, resulting in higher arsenic to antimony ratios in the leach solution, higher arsenic extraction and better separation of leach solution from leach residue. Temperatures in the range of 40° C. to the boiling point of the reaction mixture at atmospheric pressure yield effective extraction, while temperatures in the range of 80° to 100° C. are preferred. Leaching times in the range of 5 to 90 minutes are generally sufficient to obtain the desired degree of extraction.

The leach may be carried out in a single stage or in more than one stage in co- or counter-current fashion. The leach may also be carried out in a number of sequential stages. For extraction of arsenic as trioxide a single stage leach is preferred. A leach in sequential stages is preferred when hydrogen peroxide lixiviant is used. A leach in sequential stages increases the concentration of arsenic pentoxide in solution. It is noted that the solubility of arsenic pentoxide is much greater than that of arsenic trioxide. Leaching in sequential stages may be accomplished by separating leach solution from leach residue from the first stage, adding further amounts of feed materials and lixiviant to the leach solution and repeating the leach as described above. This procedure may be repeated until the desired arsenic concentration in the leach solution is attained. The number of stages is usually limited by the amount of antimony that is allowable in the solution. The leaching in sequential stages will also allow the use of lower solids loads in process slurries.

After completion of the leach, the mixture of leach solution and leach residue is subjected to a liquid-solids separation. Liquid-solids separations in the process are carried out according to conventional methods such as settling, thickening and filtration.

The separated leach residue is washed, for example, with hot water. Resulting wash liquid may be used for slurrying feed materials or may be added to the leach solution, or both, as desired. The washed leach residue, which contains substantially all antimony and a portion of the arsenic which were contained in the feed materials, may be further processed for the recovery of additional values, or may be sold, or stockpiled.

The leach solution obtained from the leach using arsenic acid lixiviant may contain arsenic in both trivalent and pentavalent form, i.e., trivalent arsenic extracted from feed materials, trivalent arsenic formed by replacement with pentavalent arsenic in leach residue containing antimony tetroxide and pentavalent arsenic from lixiviant. The leach solution is cooled to room temperatures, i.e. temperatures in the range of 5° to 25° C., and a portion of the arsenic trioxide crystallizes as a substantially pure arsenic trioxide which is separated from mother liquor. The separated arsenic trioxide may be dried to form a final product, or may be oxidized to obtain arsenic pentoxide.

To effect the oxidation of arsenic trioxide to arsenic pentoxide, one of a number of methods known in the art may be used. We prefer to effect the oxidation with hydrogen peroxide. The arsenic trioxide is mixed with a solution of hydrogen peroxide which may contain from 10 to 60% hydrogen peroxide. The hydrogen peroxide is preferably added in an amount that is at least stoichiometric for the oxidation of trioxide to pentoxide. To avoid thermal or catalytic decomposition of hydrogen peroxide, the temperature of the oxideation should be controlled to maintain the resulting slurry below about 100° C. such as, for example, by cooling, or by using a dilute hydrogen peroxide solution, or by slowly adding the hydrogen peroxide solution, or by any combination of these methods. After the addition of the required amount of hydrogen peroxide solution, the resulting viscous solution is heated until a boiling point in the range of 200° to 220° C. is obtained, after which the solution is cooled to room temperature, i.e. in the range of 5° to 25° C., resulting in the solidification of hydrated arsenic pentoxide. If desired, the hydrated arsenic pentoxide may subsequently be dried to remove free moisture and water of hydration to obtain, for example, anhydrous arsenic pentoxide.

The mother liquor from the arsenic trioxide crystallization which contains, in most cases, both trivalent and pentavalent arsenic, may be recycled to the leach to extract arsenic from further amounts of feed materials. If feed materials contain antimony tetroxide, at least a portion of the pentavalent arsenic in the arsenic acid lixiviant will have been replaced by trivalent arsenic and it may be necessary to regenerate the arsenic acid lixiviant to an arsenic acid content in the range of 25 to 200 g/l arsenic as arsenic pentoxide. The lixiviant is regenerated by oxidizing arsenic trioxide in the mother liquor to arsenic acid by one of a number of methods, such as electrolytic oxidation or oxidation with an oxidizing agent such a nitric acid or hydrogen peroxide. Oxidation is preferably accomplished by adding hydrogen peroxide solution to the mother liquor in an amount sufficient to oxidize the desired amount of trivalent arsenic to pentavalent arsenic. The reoxidation takes place readily at ambient temperatures. Regenerated arsenic acid lixiviant is returned to the leach for treatment of further amounts of feed mateirals.

The leach solution obtained from the leach using hydrogen peroxide lixiviant contains arsenic in the pentavalent form as arsenic acid and is recovered as a solution containing pentavalent arsenic. The recovered solution may be evaporated to obtain a concentrated arsenic acid solution or may be evaporated and subsequently cooled to room temperature in the range of 5° to 25° C. to obtain substantially pure, hydrated arsenic pentoxide. The hydrated arsenic pentoxide may be heated to remove at least a part of the water of hydration. The quality of product that is obtained is determined by the amount of antimony allowed in the product.

The invention will now be illustrated by the following non-limitative examples.

EXAMPLE 1

This example illustrates that arsenic can be selectively extracted from an oxidic material containing arsenic and antimony with an arsenic acid lixiviant. 500 g oxidic material containing 34.7% As and 45.0% Sb was slurried with 1 l lixiviant containing 101.3 g/l pentavalent arsenic as arsenic pentoxide in the form of arsenic acid. The slurry was reacted for 10 minutes at 90° C. and filtered. The leach solution was cooled to 20° C. and crystallized arsenic trioxide was filtered off. The leach residue and the crystallization mother liquor were combined, heated to 90° C., reacted for 10 minutes, the residue filtered and the solution cooled; crystallized arsenic trioxide was filtered off—this procedure was repeated 8 times for a total of 9 leaches. The results are given in Table I.

Table I

| Leach No. | Dry Weight $As_2O_3$ in g | $As_2O_3$ % | $As_2O_5$ % | Sb % |
|---|---|---|---|---|
| 1 | 21.7 | 98.2 | 1.3 | 0.5 |
| 2 | 19.5 | — | — | 0.4 |
| 3 | 19.4 | — | — | 0.4 |
| 4 | 15.2 | 97.2 | 2.4 | 0.4 |
| 5 | 14.0 | — | — | 0.4 |
| 6 | 10.1 | — | — | 94.0 |

Table I-continued

| Leach No. | Dry Weight $As_2O_3$ in g | $As_2O_3$ % | $As_2O_5$ % | Sb % |
|---|---|---|---|---|
| 7 | 14.7 | 96.1 | 3.4 | 0.5 |
| 8 | 3.4 | — | — | 1.8 |
| 9 | 2.4 | — | — | 2.7 |

The final filtrate (crystallization mother liquor) contained 13.0 g/l pentavalent and 21.5 g/l trivalent arsenic. The final leach residue was displacement washed with 1 l hot water. The wash filtrate contained 1.2 g/l pentavalent and 6.6 g/l trivalent arsenic. The washed residue weighed 380 g (dry weight) and contained 25.7% As and 47.5% Sb. A total of 120.4 g arsenic trioxide containing 0.6 g antimony was recovered.

As can be seen from the above results, an almost pure arsenic trioxide can be extracted from oxidic material containing arsenic and antimony.

EXAMPLE 2

This example illustrates that arsenic can be selectively extracted from an oxidic material containing arsenic and antimony with a hydrogen peroxide lixiviant. The oxidic material was an antimony furnace baghouse dust collected from an antimony recovery operation.

A first portion of 2 kg dust was slurried in 2 l water at 15° C. and a 30% hydrogen peroxide solution was slowly added in stages. The slurry was not heated but, during this cold leach, the temperature rose to 60° C.

A second portion of 2 kg dust was slurried in 2 l water, the slurry was heated to 95° C. and a 30% hydrogen peroxide solution was slowly added in stages. The temperature was maintained at 95° C. during the hot leach.

After each addition of hydrogen peroxide solution, the resulting leach solution was sampled and analyzed for As and Sb contents; the ratio of As to Sb in each solution was determined. The results are shown in Table II.

Table II

| Cumulative Volume of $H_2O_2$ Added in ml | Cold Leach Solution | | | Hot Leach Solution | | |
|---|---|---|---|---|---|---|
| | As g/l | Sb g/l | Ratio As/Sb | As g/l | Sb g/l | Ratio As/Sb |
| 100 | 33.0 | 0.3 | 110.7 | 41.0 | 0.4 | 101.5 |
| 200 | 47.0 | 1.1 | 42.9 | 65.0 | 0.7 | 100.6 |
| 300 | 80.0 | 3.9 | 20.5 | 94.0 | 1.5 | 62.9 |
| 400 | 112.0 | 9.4 | 12.0 | 125.0 | 3.6 | 34.6 |
| 600 | 220.0 | 38.0 | 5.8 | 205.0 | 6.6 | 31.1 |
| 800 | 234.0 | 105.0 | 2.2 | 308.0 | 13.6 | 22.6 |
| 1000 | 256.0 | 155.0 | 1.7 | 401.0 | 106.0 | 3.8 |

As can be seen from the results, leaching with hydrogen peroxide lixiviant can selectively extract arsenic from oxidic material containing As and Sb and leaching at elevated temperature is more effective than at low temperature, resulting in higher As/Sb ratios in the leach solution.

EXAMPLE 3

This example illustrates that substantially pure arsenic trioxide can be separated from oxidic material containing arsenic and antimony in a single stage leach with arsenic acid lixiviant and that lixiviant can be regenerated by oxidation with hydrogen peroxide.

Arsenic acid lixiviant was prepared by regeneration of an 8.5 l solution obtained from previous leaches and containing 33.8 g/l pentavalent and 39.3 g/l trivalent arsenic. The solution was treated with 217 ml of a 30% hydrogen peroxide solution at room temperature and diluted to 9 l. The regenerated lixiviant contained 49.6 g/l pentavalent and 15.9 g/l trivalent arsenic.

890 g oxidic material containing 41.9% As and 34.1% Sb were slurried with the 9 l lixiviant and the slurry was heated to 90° C. and agitated for one hour. The volume of the slurry was adjusted to 10 l. The solids were then allowed to settle while the temperature was maintained at 90° C. The supernatant liquid was decanted and the settled solids were filtered. 9.5 l of clarified solution and 885 g wet solids containing 25.9% moisture were recovered. The residue was dried. The dried residue weighed 656 g and contained 28.3% As and 43.3% Sb. To the filtrate were added 200 g arsenic trioxide seed crystals and the filtrate was cooled to 20° C. under agitation. Crystallized arsenic trioxide was filtered off and 569 g crystals (369 g net) of arsenic trioxide and 8.6 l mother liquor were obtained. The arsenic trioxide crystals contained 4.0% moisture, 0.4% Sb and 73.3% As. The mother liquor contained 36.7 g/l pentavalent and 17.9 g/l trivalent arsenic.

EXAMPLE 4

This example illustrates the effect of antimony tetroxide. 1080 g of oxidic materials obtained from an antimony furnace baghouse and containing 32.7% arsenic and 43.6% antimony was slurried with 9 l of solution containing 50.0 g/l pentavalent arsenic and 7.1 g/l trivalent arsenic. The slurry was heated at 90° C. for one hour and then filtered. 8.8 l filtrate containing 38.5 g/l pentavalent arsenic and 38.2 g/l trivalent arsenic and 1155 g residue containing 24.8% moisture were obtained. The amount of pentavalent arsenic which was replaced by trivalent arsenic was 111.2 g. If all the antimony in the oxidic materials was in the form of antimony tetroxide, the amount of replaced pentavalent arsenic according to the equation $Sb_2O_4 + As(V) = Sb_2O_5 + As(lll)$ would be 145 g. The amount actually replaced was 111.2 g. This indicates that the oxidic material contained about 77% antimony tetroxide.

EXAMPLE 5

This example illustrates that arsenic trioxide can be completely oxidized to arsenic pentoxide with a substantially stoichiometric amount of hydrogen peroxide at room temperature.

100 g arsenic trioxide containing 73.5% As on a dry basis was slowly mixed with 25 ml water and 100 ml of a 30% hydrogen peroxide solution over a period of 55 minutes. The temperature rose to 60° C. during this period. The resulting solution was subsequently heated until a boiling point of 208° C. was reached. The solution was then cooled resulting in solidification and the solid product was dried for 16 hours at 175° C. The dried product weighed 112.9 g containing 112.8 g of arsenic pentoxide and 0.1 g $As_2O_3$.

What we claim as new and desire to protect by Letters Patent of the United States is:

1. A process for extraction of arsenic from oxidic materials containing oxides of arsenic and antimony, said oxides being chosen from the group consisting of arsenic trioxide, arsenic pentoxide, antimony trioxide, antimony pentoxide, antimony tetroxide and mixed arsenic-antimony oxides which comprise the steps of subjecting said materials to a leach with a lixiviant of an aqueous solution containing arsenic acid in a concentration in the range of 25 to 200 g/l arsenic as arsenic pentoxide to substantially prevent dissolution of antimony, carrying out said leach at a temperature in the range of from 40° C. to the boiling point of the reaction mixture at atmospheric pressure for a time in the range of 5 to 90 minutes whereby a leach solution and a leach residue are formed, extracting at least a portion of the arsenic from said materials into said leach solution substantially retaining antimony in a leach residue, separating the leach solution from the leach residue, cooling separated leach solution to a temperature in the range of 5° to 25° C. whereby arsenic trioxide crystallizes with formation of mother liquor, recovering crystallized arsenic trioxide, treating mother liquor to regenerate lixiviant and returning regenerated lixiviant to the leach.

2. A process as claimed in claim 1, wherein mother liquor is treated with hydrogen peroxide at ambient temperatures in an amount sufficient to give a regenerated lixiviant containing not more than 200 g/l arsenic as arsenic pentoxide for regeneration of lixiviant.

3. A process for extraction of arsenic from oxidic materials containing oxides of arsenic and antimony, said oxides being chosen from the group consisting of arsenic trioxide, arsenic pentoxide, antimony trioxide, antimony pentoxide, antimony tetroxide and mixed arsenic-antimony oxides which comprises the steps of subjecting said materials to a leach with a lixiviant of an aqueous solution containing hydrogen peroxide in a concentration in the range of 10 to 60% the amount of lixiviant being sufficient to selectively extract the extractable portion of arsenic from the oxidic materials as arsenic pentoxide and to oxidize the amount of arsenic trioxide formed by replacement of arsenic pentoxide by any antimony tetroxide present in the materials, carrying out said leach at a temperature in the range of from 40° C. to the boiling point of the reaction mixture at atmospheric pressure whereby a leach solution and a leach residue are formed, separating the leach solution from the leach residue and recovering arsenic pentoxide from the leach solution.

4. A process as claimed in claim 3, wherein said leach is carried out by sequential multiple-stage leaching.

5. A process as claimed in claim 1 or 3, wherein the leach is carried out at a temperature in the range of 80° to 100° C.

* * * * *